US006807985B2

(12) United States Patent
Stares et al.

(10) Patent No.: US 6,807,985 B2
(45) Date of Patent: Oct. 26, 2004

(54) HIGH RANGEABILITY CONTROL VALVE

(75) Inventors: James A. Stares, Norton, MA (US); Christopher Bittner, East Freetown, MA (US)

(73) Assignee: Dresser, Inc., Addison, TX (US)

( * ) Notice: Subject to any disclaimer, the term of this patent is extended or adjusted under 35 U.S.C. 154(b) by 113 days.

(21) Appl. No.: 10/163,327

(22) Filed: Jun. 5, 2002

(65) Prior Publication Data

US 2003/0226600 A1 Dec. 11, 2003

(51) Int. Cl.[7] .............................................. F16K 11/07
(52) U.S. Cl. ............................. 137/625.33; 137/625.39
(58) Field of Search ........................ 137/625.3, 625.33, 137/625.39, 625.37; 251/118

(56) References Cited

U.S. PATENT DOCUMENTS

| 3,268,235 A | | 8/1966 | Hacobellis et al. | |
|---|---|---|---|---|
| 3,704,726 A | * | 12/1972 | Lewis | 137/625.3 |
| 3,857,542 A | | 12/1974 | Heymann | |
| 4,004,613 A | * | 1/1977 | Purton et al. | 137/625.3 |
| 4,153,145 A | * | 5/1979 | Ellis et al. | 188/274 |
| 4,256,284 A | | 3/1981 | Balhouse | 251/126 |
| 4,617,963 A | * | 10/1986 | Stares | 137/625.3 |
| 5,150,736 A | | 9/1992 | Vincent de Paul et al. | |
| 5,492,150 A | | 2/1996 | Aquilino | 137/630.13 |
| 5,516,079 A | | 5/1996 | Baumann | 251/61 |
| 5,964,248 A | | 10/1999 | Enarson et al. | |

FOREIGN PATENT DOCUMENTS

| EP | 0156672 | 12/1985 |
|---|---|---|
| EP | 0525688 | 2/1993 |

OTHER PUBLICATIONS

Masoneilan CH 3000 Catalog 1997, pp. 2 and 13.
Bailey Japan Co., Ltd., Date Unknown, pp. 281–282.
Dezurik/Copes–Vulcan Bulletin 109, May 2001.

* cited by examiner

Primary Examiner—John Fox
(74) Attorney, Agent, or Firm—Fish & Richardson P.C.

(57) ABSTRACT

A guided control valve comprising a vapor recovery area that encourages collapse of vapor bubbles. In a cage-guided valve, a seal comprising inner and outer members reduces flow through a radial clearance between a plug and a cage. The vapor recovery area is positioned below the seal and above a seat interacting with the plug. The vapor recovery area encourages collapse of vapor bubbles to reduce damage to the valve trim.

42 Claims, 4 Drawing Sheets

HIGH RANGEABILITY CONTROL VALVE

FIELD OF THE INVENTION

This invention is directed generally to flow control valves and more specifically to cage-guided control valves.

BACKGROUND OF THE INVENTION

U.S. Pat. No. 4,256,284 describes a high energy loss fluid flow control device that uses a stepped-spiraled-tapered bore and control element to minimize clearance flow. The '284 patent, however, presents a clearance flow minimizing design that is physically and operationally different from the invention. The '284 patent design does not address specific geometry for controlling the pressure recovery of the controlled fluid and it does not allow for high rangeability.

A typical globe valve is a valve with a linear motion closure member, one or more ports and a body typically distinguished by a globular shaped cavity around the port region. The body is the part of the valve which is the main pressure boundary. The body typically provides the pipe connecting ends and the fluid flow passageway. In a globe valve, the closure member is a movable part of the valve that is positioned in the flow path to modify the rate of flow through the valve.

A plug closure member is a part, often cylindrical in nature, which moves in the flow stream with linear motion to modify the flow rate. It may or may not have a contoured portion to provide flow characterization. It may also be a cylindrical or conically tapered part, which may have an internal flow path, that modifies the flow rate with rotary motion. Other closure members include ball, disk and gate, for example.

A flow orifice in the flow passageway (path) interacts with the closure member to close the valve. The orifice may be provided with a seating surface, to be contacted by or closely fitted to the closure member, to provide tight shut-off or limited leakage, i.e., to close the valve.

A cage is typically a part in a globe valve that generally surrounds the closure member to provide alignment and facilitate assembly of other parts of the valve trim. The cage may also provide flow characterization and/or a seating surface. Globe valve trim typically includes the internal parts of a valve which are in flowing contact with the controlled fluid. Examples of valve trim are the plug, seat ring and cage. The body is not considered part of the trim.

FIG. 1 depicts a standard cage-guided globe control valve 10, comprising a body 12, that controls flow 14 by modulating the valve plug 16 to expose holes 18 (ports or flow paths) of a port region 19 in the valve cage 20. Controlling surfaces are surfaces that define an area that throttles the process fluid, i.e., the surface is subject to the application of pressure differential. Other surfaces may be in contact with the fluid, but are not actively involved in the throttling process. The controlling surface is either between the cage port 18 and plug 16 (FIG. 2) or the seat ring 22 and plug 16 depending upon plug 16 position within the cage 20.

To obtain high flow capacities through such a valve, large size seat rings, cages, and plugs are utilized. To allow free movement of the plug 16 within the cage 20, a radial clearance 24 must be provided between the plug outside diameter 26 and the cage bore 28 (FIG. 3). This radial clearance 24 typically increases with increasing valve size. As the plug 16 is lifted off of the valve seating surface 30, and before the initial cage port area 32 is exposed, the radial clearance area 24 is allowed to pass fluid flow 34. The flow 34 transmitted through this radial clearance area 24 is the minimum flow in the valve 10. The clearance flow area 24 is important in this type of valve design because this area 24 will limit the minimum controllable flow as defined by the valve characteristic.

The flow characteristic of a cage throttling control valve 10 is defined by the cage port throttling area exposed (see, for example, FIGS. 2 and 3, items 38 and 18, respectively). Throttling below the cage port area causes the entire throttling pressure drop to occur in the clearance flow area 24 (i.e., flow through the guide clearance). Under high-pressure drop conditions, particularly high-pressure liquid letdown (as opposed to gas), clearance flow throttling can be very damaging to metal surfaces, thereby causing erosion 36. Some cage throttling valves 10 will utilize multiple pressure drop staging 38 throughout the cage flow area, however, the staged flow ports (40 in FIG. 2) located above the throttling area 42 have direct communication to the valve outlet (orifice) 44 through the guide clearance area 24. This will lead to full pressure drop between the non-exposed staged flow paths and the exposed flow paths (see FIG. 2). This can ultimately lead to erosion 36 in the guide clearance 24 due to cavitation and high-velocity wear, resulting in eventual valve-clearance vibration problems. Continued erosion will increase the guide clearance and further exacerbate vibration-related problems.

Valve manufacturers define the ratio of maximum controllable flow to minimum controllable flow as the valve rangeability. Most cage-guided globe control valves have a rangeability, limited by the clearance flow, to approximately 100:1.

OBJECTS OF THE INVENTION

Accordingly, it is an object of the invention to provide a valve with rangeability greater than approximately 100:1. A further object is to provide a valve with rangeability greater than approximately 500:1.

Another object is to provide a valve that reduces or eliminates cavitation erosion damage to seating areas.

Another object is to provide a valve with a pressure recovery area, away from the seating area.

Yet another object is to provide a valve with increased rangeability that reduces or eliminates cavitation damage on seating surfaces.

Another object is to provide a valve with a clearance seal.

Yet another object is to provide a valve with a clearance seal and a pressure recovery area.

Other objects and advantages will be apparent from the teachings herein.

SUMMARY OF THE INVENTION

Briefly, in accordance with the foregoing, a control valve comprising a vapor recovery area addresses problems associated with the prior art. A seal is preferably positioned above the vapor recovery area to reduce flow between a closure member and alignment means for the closure member.

In an embodiment of a globe control valve, a plug is aligned in a cage to contact a seat. The vapor recovery area is positioned between the cage and the plug. Preferably, at least when the plug is opened, the vapor recovery area is above the seat. The seal reduces flow through a clearance between the cage and the plug. For some applications, the seal comprises an outer seal contacting the cage and an inner seal between the outer seal and the plug.

More generally, a control valve is provided with means for encouraging collapse of vapor bubbles. In a particular embodiment, a closure member interacts with an orifice to close the valve. A clearance is defined between the closure member and a means for aligning the closure member. Means for reducing flow through the clearance comprises, for example, a seal coupled to move with the closure member.

More specifically, a control valve may be provided with a linearly movable plug positioned in a fluid flow path. The plug moves in a cage comprising a plurality of ports located axially along the cage. Thus, moving the plug will modify the rate of fluid flow. A radial clearance is defined between the cage and the plug. And a seal, comprising an elastomeric inner seal and metallic outer seal, reduces flow through the clearance. The plug defines, at least in part, a vapor recovery gallery between the plug and the cage, wherein the gallery is below the lowest port when the plug is seated. When the plug is lifted to expose, at least in part, the lowest port, the gallery is above a seat that interacts with the plug to close the valve.

It will be understood that use of directional terms such as above and below are for convenience only and not intended to limit the scope of the teachings or invention claimed herein. Generally an above position is upstream, opposite the direction of fluid flow, of a down position.

DETAILED DESCRIPTION OF THE ILLUSTRATED EMBODIMENT

Figure 4:
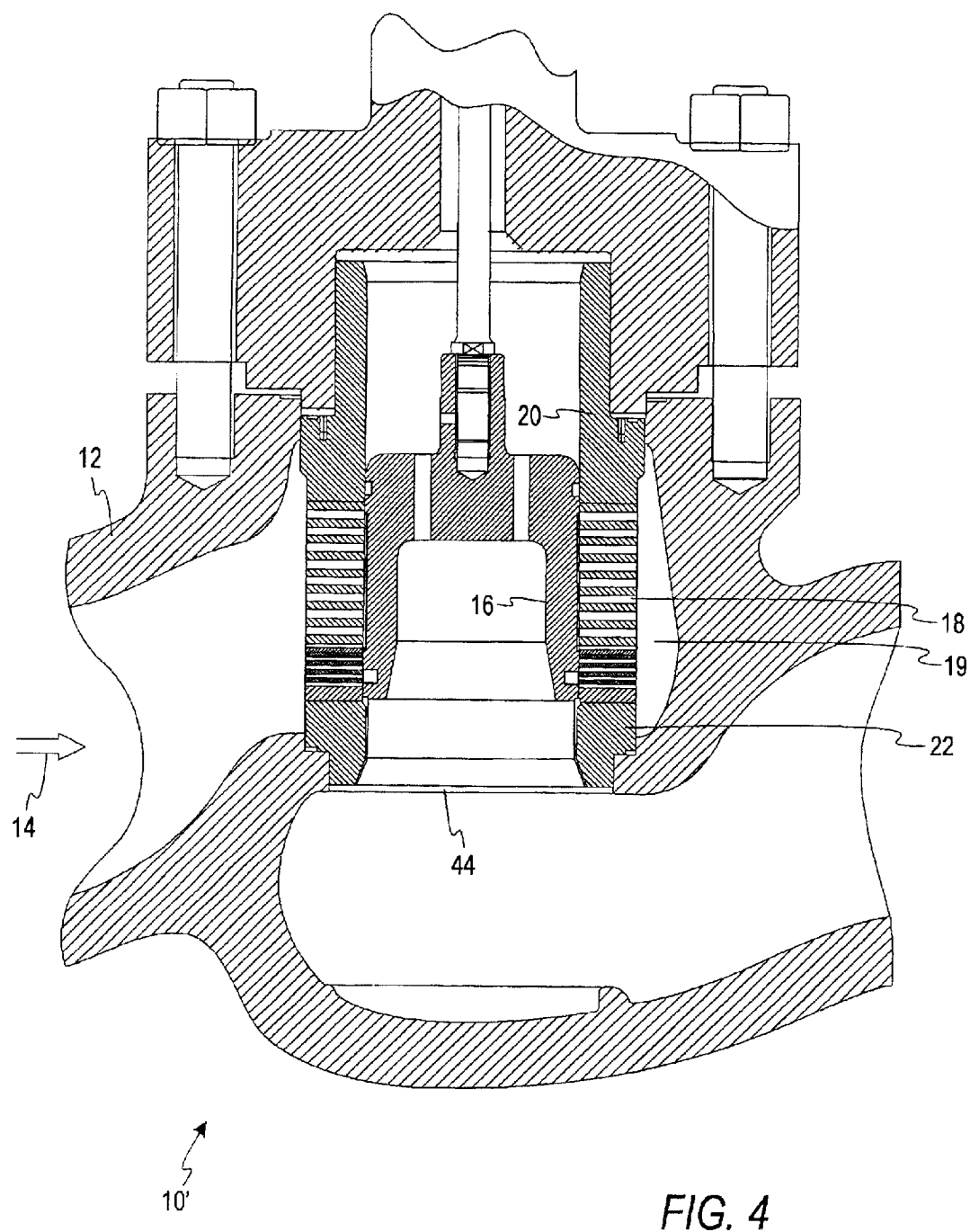
FIG. 4 shows a section view of a cage-guided control valve in accordance with the teachings herein and comprising a seal coupled with the plug.
Figure 5:
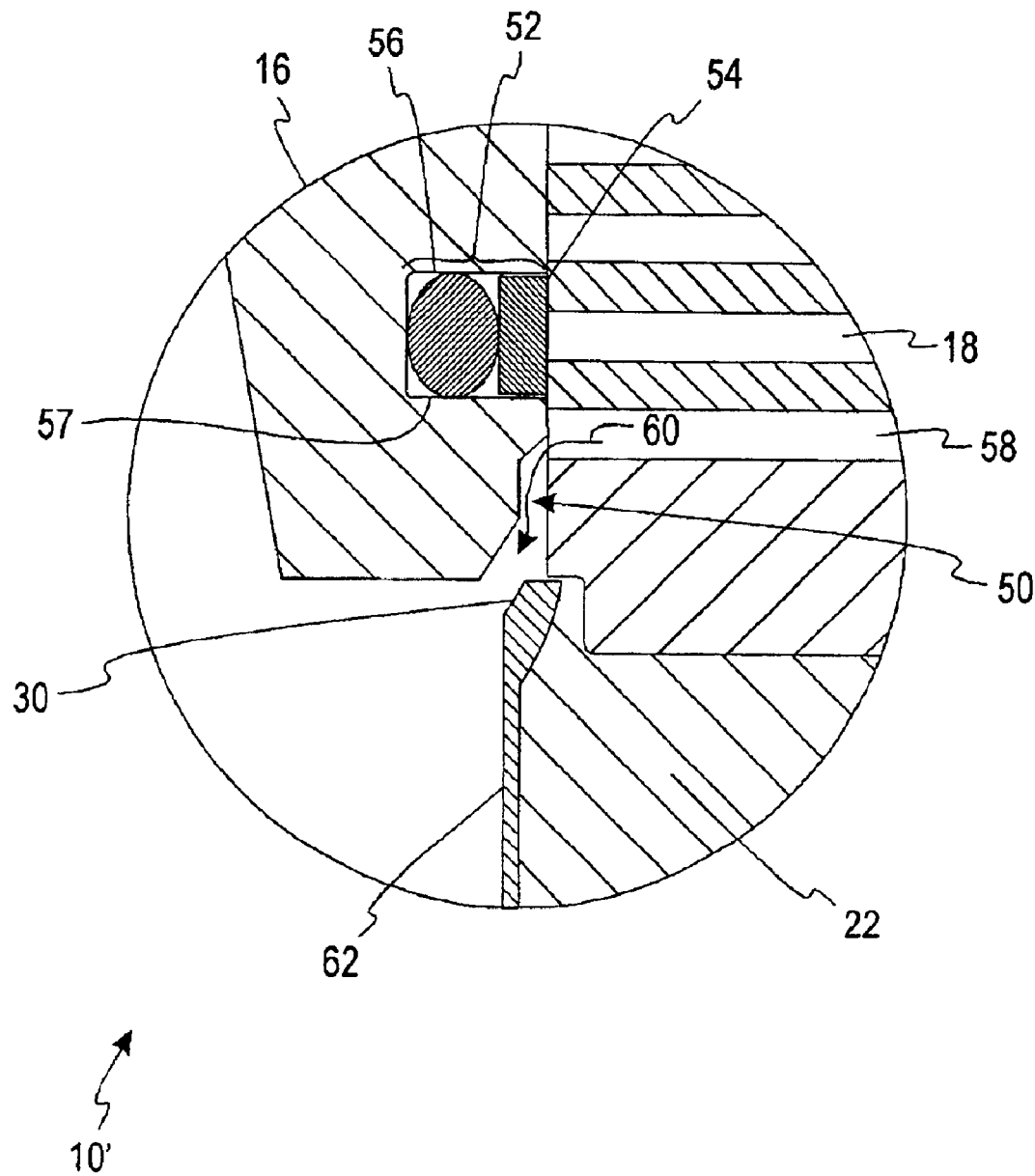
FIG. 5 shows a close-up section view of a throttling area of the valve shown in FIG. 4. A two member seal is depicted in combination with a pressure recovery gallery.

Referring to FIGS. 4 and 5, an improved cage-guided globe control valve 10' is depicted. It will be apparent from the following to those of skill in the art that the claimed invention is not restricted solely to cage-guided globe control valves. In FIGS. 4–5 a linearly movable plug 16 is positioned in a fluid flow path to modify a rate of flow, including substantially stopping the flow. Other closure members are acceptable to modify the rate of flow. A staged cage 20 aligns the plug 16. The staged cage 20 comprises a plurality of ports 18 in a port region 19 that are located axially along the cage 20. Thus, fluid flow is varied through movement of the plug 16. The plug 16 and the cage 20 define a radial clearance 24. A seating surface 30 interacts with the plug 16 to substantially stop the fluid flow 14 when the plug 16 is seated. A pressure recovery area 50, which is a gallery, i.e., cylindrical or ring-like in nature, in a preferred embodiment, is defined between the plug 16 and the cage 20. Preferably, the pressure recovery area 50 is below the plurality of ports 18 when the plug 16 is seated. A clearance flow seal 52 is positioned between the cage 20 and plug 16 and above the seat 30. The clearance seal 52 illustrated comprises an outer seal 54, preferably of metal, and an inner seal 56, preferably of elastomer.

Figure 1:
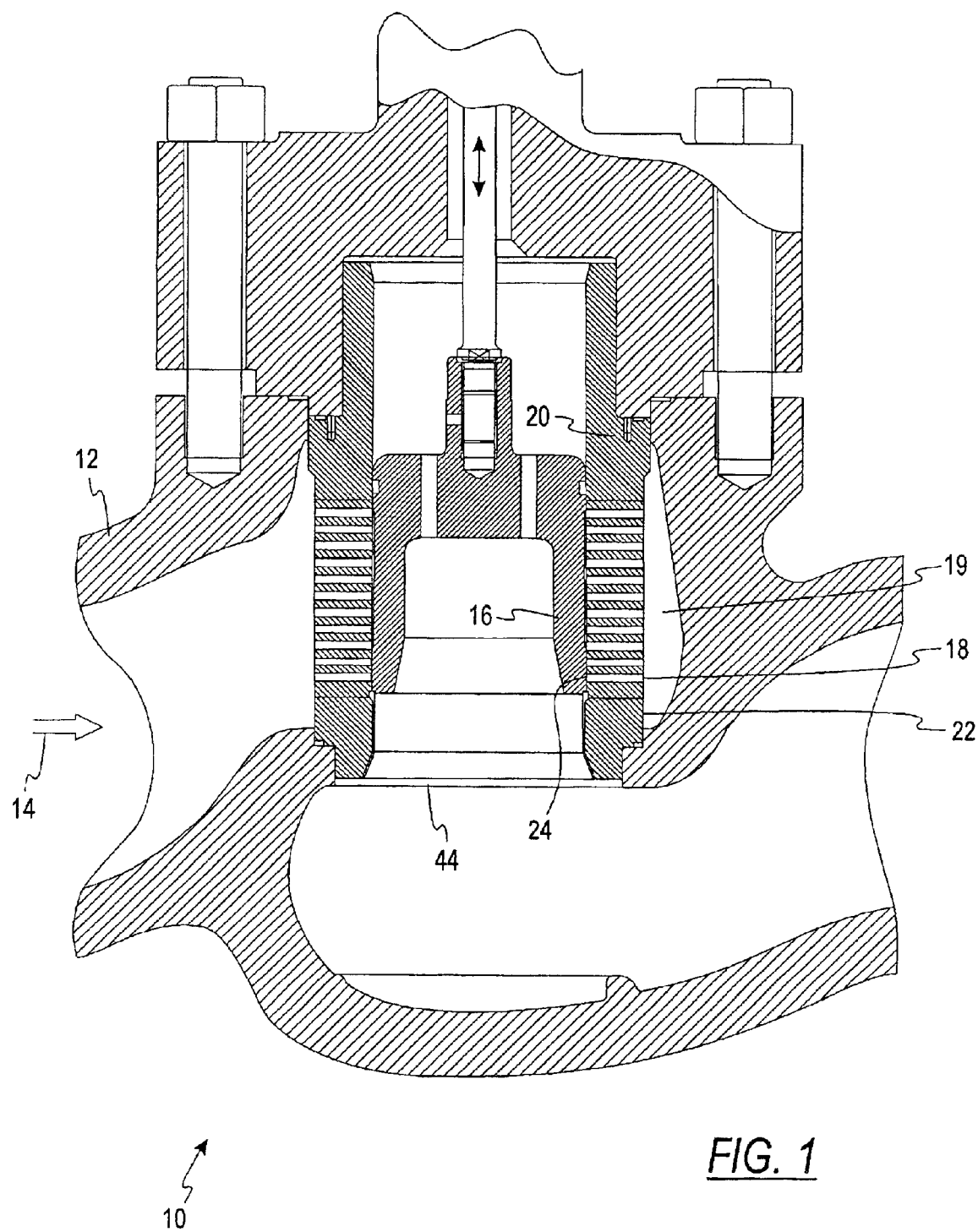
FIG. 1 shows a section view of a prior art cage-guided control valve.
Figure 2:
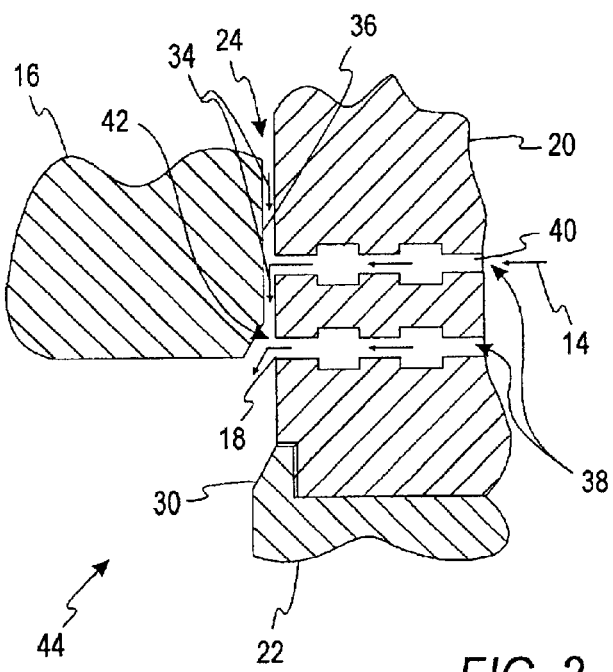
FIG. 2 shows a section view of typical prior art staged flow path trim.

Accordingly, one embodiment of a valve consists of a specially designed clearance flow seal 52 and a pressure recovery area 50 below the seal 52, between the plug 16 and the cage 20. The seal 52 consists of an outer guide ring and an inner sealing ring 56 with an overlapping joint 57. The outer ring 54 contacts the cage bore 28 (see FIG. 2), providing the primary guide clearance seal. The elastomeric inner seal ring 56 prevents fluid from passing behind the primary seal. Further, the elastomeric inner ring 56 provides additional energizing to the primary seal 54. As the valve 10' is opened and the first cage ports 58 are exposed by moving the plug 16 up, the controlled fluid 60 is allowed to pass between the cage port 58 and the clearance flow seal 54. In some applications, the seat 30 is formed on a hardened surface 62 (see, for example, FIG. 5) to resist erosion.

Figure 3:
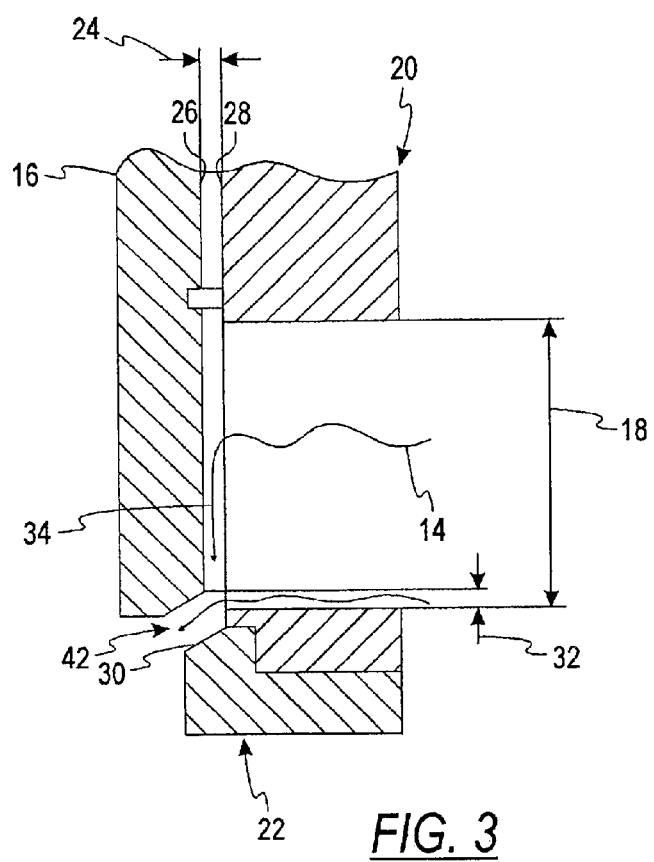
FIG. 3 shows a close-up section view of a throttling area of the prior art valve shown in FIG. 1.

The initial exposure of a flow path in a valve is typically the greatest pressure-reducing phase in the valve application. When fluid passes through an orifice restriction, such as the cage port—seal interface (see clearance flows 34 and throttling area 42 in FIG. 3 or flow 60 in FIG. 5), the local fluid pressure may fall below the vapor pressure of the controlled fluid. If this occurs, the fluid will form vapor cavities, i.e., it will boil. At some distance downstream of the vapor cavity creation, the pressure will again rise above the vapor pressure and the vapor bubble will collapse, i.e., cavitation will occur. The collapse of the vapor bubble will release very large amounts of energy in the form of either shock waves or high velocity fluid jets. Nearby surfaces, during such collapses, can become damaged. The pressure recovery gallery 50 provides an area that will encourage collapse of vapor bubbles, thereby preventing the bubbles from travelling and collapsing further downstream and damaging critical seating surfaces.

Accordingly, in one embodiment, a closure member, for example the plug 16 or other member, is positioned in the fluid flow 14 path to modify the rate of fluid flow. The cage 20 aligns the closure member and comprises one or more ports 18 through which fluid flows. A clearance 24 is defined between the cage 20 and the closure member 16. A seating surface 30 interacts with the closure member 16 to close the valve. A pressure recovery area 50 is located between the cage 20 and the closure member 16. Preferably the pressure recovery area 50 is below the one or more ports 18 when the closure member 16 is seated on the seating surface 30.

Past attempts in the prior art did not address the clearance flow issue directly. Instead, problems associated with a high rangeability valve application has typically been solved through the use of two valves. One valve is for high-pressure drop low-flow service and another valve, usually installed in a parallel pipeline, is for high-capacity low-pressure drop service. This prior art arrangement provides a costly solution that has also proven difficult to control properly. Special control programming is required to ensure proper sequencing (opening and closing based on flow demand) of the low flow by-pass valve and the high-capacity main valve. Improper sequencing can result in operating the main valve plug too close to the valve seat resulting in damaging clearance flow levels.

Alternatively, a single valve solution in the prior art to this problem has utilized a special cage and plug designed with staged flow paths and reduced radial clearances. These designs are nevertheless limited by the clearance gap flow (see, for example, FIG. 2, item 34).

One of the problems solved by this invention is how to increase the valve rangeability for high-pressure letdown applications while reducing the associated erosion and vibration problems inherent with throttling down to or below the plug-to-cage clearance flow area. Throttling below the clearance flow area can be achieved by operating the valve at very low lifts, thereby exposing a minute gap between the seating surfaces. But this type of throttling leads to erosion of the seating surfaces. Erosion of the seating surfaces further leads to a reduction of tight shut-off capability, resulting in continued seat erosion and leakage when the valve is closed. The teachings herein address both the aforementioned problems through significant reduction of the guide clearance flow, through the clearance flow seal, and protection of the seating surfaces from erosion by the reduction of high-velocity flow at minimum plug lift positions, through the pressure recovery area. In some applications, this invention forces the high-pressure drop to occur only in the lowest exposed throttling flow paths, not through the o clearance area.

In one embodiment, the cage 20 aligns the closure member 16 in the flow 14 to modify the rate of flow. The cage 20 and the closure member 16 define the clearance 24 through which fluid 34 flows, or tries to flow. A flow orifice 44 in the flow path comprises a seating surface 30. The closure member 16 interacts with the seating surface 30 to close the valve. A clearance flow seal 52 is positioned between the closure member 16 and the cage 20 to reduce, and in some applications to stop, flow 34 through the clearance 24.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. A globe control valve comprising a plug movably aligned in a cage to contact a seat to close the valve, wherein the cage includes a cage wall, the improvement comprising a pressure recovery area between the plug and the cage, wherein the plug includes a recessed portion with at least one wall in the recessed portion substantially parallel to the cage wall, and the pressure recovery area is substantially defined by the area between the cage wall and the recessed portion.

2. The globe control valve of claim 1, wherein the pressure recovery area is a gallery.

3. The globe control valve of claim 1, wherein the pressure recovery area is positioned above the seat.

4. The globe control valve of claim 1, wherein the plug and the cage define a radial clearance and the improvement comprises a clearance flow seal above the pressure recovery area.

5. The globe control valve of claim 4, wherein the clearance flow seal comprises:
an outer seal contacting the cage; and
an inner seal between the plug and the outer seal.

6. The globe control valve of claim 5, wherein the outer seal comprises an overlapping joint.

7. The globe control valve of claim 5, wherein the inner seal is elastomeric.

8. A control valve comprising:
a body defining a fluid flow path;
a closure member positioned in the flow path to modify a rate of fluid flow through the valve;
a flow orifice in the flow path comprising a seating surface interacting with the closure member to close the valve; and
a pressure recovery area defined, at least in part, by the closure member when positioned above the seating surface, wherein at least a portion of the flow path includes a first wall, the closure member includes a second wall substantially parallel to the first wall, and wherein the pressure recovery area includes a gap between the first and second walls.

9. The control valve of claim 8, comprising a port region in the body, wherein the port region comprises one or more ports through which fluid flows and with which the closure member interacts to modify the rate of fluid flow through the valve.

10. The control valve of claim 9, comprising a cage aligning the closure member, wherein the cage comprises the one or more ports.

11. The control valve of claim 10, wherein the pressure recovery area is between the closure member and the cage.

12. The control valve of claim 10, wherein the cage and the closure member define a clearance and the control valve comprises a clearance flow seal reducing flow through the clearance.

13. The control valve of claim 8, wherein the control valve has a rangeability greater than 100:1.

14. The control valve of claim 8, wherein the control valve has a rangeability greater than 500:1.

15. The control valve of claim 12, wherein the clearance flow seal comprises:
an outer seal contacting the cage; and
an inner seal between the outer seal and the closure member.

16. The control valve of claim 12, wherein the pressure recovery area is between the closure member and the cage.

17. The control valve of claim 16, wherein the pressure recovery is between the clearance flow seal and the seating surface.

18. The control valve of claim 17, wherein the closure member is a plug.

19. The control valve of claim 18, wherein the plug is cylindrical.

20. A control valve comprising:
a body defining a fluid flow path;
a closure member positioned in the flow path to modify a rate of fluid flow;
a cage aligning the closure member, wherein the cage and the closure member define a clearance through which fluid flows;
a flow orifice in the flow path comprising a seating surface interacting with the closure member to close the valve; and
a clearance flow seal between the closure member and the cage and above the seating surface, wherein the clearance flow seal comprises an outer seal contacting the cage and an inner seal between the outer seal and the closure member.

21. The control valve of claim 20, wherein the valve has a rangeability greater than 100:1.

22. The control valve of claim 20, wherein the valve has a rangeability greater than 500:1.

23. The control valve of claim 20, wherein the inner seal is elastomeric.

24. A control valve comprising:
a body defining a fluid flow path;
a closure member positioned in the fluid flow path to modify a rate of fluid flow;
a cage aligning the closure member and comprising one or more ports through at least one sidewall of the cage, through which fluid flows, wherein the cage and the closure member define a clearance through which fluid flows;

a flow orifice in the flow path comprising a seating surface interacting with the closure member to close the valve;

a clearance flow seal positioned above the seating surface and between the closure member and the cage to reduce flow through the clearance; and a pressure recovery area above the seating area, defined by a recess of the closure member with at least one wall substantially parallel to the at least one sidewall of the cage.

25. The control valve of claim 24, wherein the closure member is a plug adapted to move linearly.

26. The control valve of claim 24, wherein the pressure recovery area is below the clearance flow seal.

27. The control valve of claim 26, wherein the clearance flow seal comprises:

an outer seal contacting the cage; and an inner seal between the closure member and the outer seal.

28. The control valve of claim 27, wherein the inner seal is elastomeric.

29. The control valve of claim 24, wherein the pressure recovery area is below the one or more ports when the closure member is seated on the seating surface.

30. The control valve of claim 29, wherein the closure member is a cylindrical plug adapted for linear movement in the cage, and the pressure recovery area is a gallery between the cage and the plug.

31. The control valve of claim 30, wherein the clearance flow seal comprises:

an outer seal contacting the cage; and an inner seal between the outer seal and the plug, wherein the inner seal is elastomeric.

32. A control valve comprising:

a linearly movable closure member positioned in a fluid flow path to modify a rate of fluid flow, wherein the closure member includes a recessed portion with at least one surface of the recessed portion substantially parallel to the linear path of the closure member;

a cage aligning the closure member and comprising:
one or more ports through which fluid flows, wherein the cage and the closure member define a clearance; and
at least one surface defining the linear path of the closure member;

a seating surface interacting with the closure member to close the valve; and a pressure recovery area between the cage and the closure member, wherein the pressure recovery area is below the one or more ports when the closure member is seated on the seating surface, and wherein the pressure recovery area is substantially defined by a space between the at least one surface of the closure member parallel to the linear path and the at least one surface of the cage defining the linear path of the closure member.

33. A control valve comprising:

a linearly movable plug positioned in a fluid flow path to modify a rate of flow, wherein the plug includes a recessed portion with at least one wall substantially parallel to the direction of linear movement of the plug;

a staged cage aligning the plug and comprising a plurality of ports located axially along wall of the cage to vary fluid flow through movement of the plug, wherein the plug and the cage define a radial clearance, and wherein at least one wall of the recess of the plug is substantially parallel to the cage wall;

a seating surface interacting with the plug to close the valve when the plug is seated;

a pressure recovery area between the plug and the cage, wherein the pressure recovery area is below the plurality of ports when the plug is seated, and wherein the pressure recovery area is substantially defined by a gap having a uniform volume, the gap between the recessed portion of the plug and the cage wall; and a clearance flow seal between the cage and the plug and above the seat.

34. The control valve of claim 33, wherein the clearance seal comprises an outer seal contacting the cage and an inner elastomeric seal between the plug and the outer seal, whereby the clearance seal reduces fluid flow through the radial clearance.

35. A control valve comprising:

a closure member positioned in a fluid flow path to modify a rate of fluid flow;

an orifice in the fluid flow path;

means for aligning the closure member;

a first clearance defined between the closure member and the means for aligning the closure member; and means for encouraging the collapse of vapor bubbles, said means positioned between the orifice and the closure member when the closure member is opened, such that said means is substantially normal to the fluid flow path.

36. The control valve of claim 35, comprising means for reducing fluid flow through the clearance.

37. The control valve of claim 35, wherein:

the closure member is a plug adapted to move linearly in the means for aligning the closure member;

the orifice comprises a seating ring comprising a seating surface interacting with the plug to close the valve; and the plug defines, at least in part, the means for encouraging collapse of vapor bubbles.

38. The control valve of claim 37, comprising means for reducing fluid flow through the clearance.

39. The control valve of claim 38, wherein the means for reducing fluid flow through the clearance is positioned above the seating surface and moves linearly with the plug.

40. The control valve of claim 35, wherein the means for encouraging collapse of vapor bubbles is positioned above the seating surface when the closure member is closed.

41. A control valve comprising:

an orifice in a fluid flow path, the orifice comprising a seating surface;

a cage comprising one or more ports above the seating surface;

a plug operatively positioned for linear movement in the cage to modify a rate of fluid flow, wherein the plug and the cage define a clearance;

a seal coupled with the plug positioned in the clearance; and a vapor recovery area below the seal and between the plug and the cage, wherein the vapor recovery area is at least partially defined by a recess in the plug, and wherein the recess has at least one wall that is substantially parallel to the linear movement of the plug.

42. The control valve of claim 41, wherein the plug is cylindrical and the vapor recovery area is a gallery defined, at least in part, by the plug.

* * * * *

UNITED STATES PATENT AND TRADEMARK OFFICE
CERTIFICATE OF CORRECTION

PATENT NO.   : 6,807,985 B2
DATED        : October 26, 2004
INVENTOR(S)  : James Albert Stares and Christopher Bittner It is certified that error appears in the above-identified patent and that said Letters Patent is hereby corrected as shown below:

Title page,
Item [56], References Cited, U.S. PATENT DOCUMENTS, replace "Hacobellis" with -- Jacobellis --;
FOREIGN PATENT DOCUMENTS, in "0156672" replace "12/1985" with -- 10/1985 --.

Column 5,
Line 17, after "the" delete "o".

Column 7,
Line 65, after "along" and before "wall" insert -- a --.

Signed and Sealed this

Twenty-third Day of August, 2005

JON W. DUDAS
*Director of the United States Patent and Trademark Office*

UNITED STATES PATENT AND TRADEMARK OFFICE
CERTIFICATE OF CORRECTION

PATENT NO. : 6,807,985 B2  Page 1 of 1
APPLICATION NO. : 10/163327
DATED : October 26, 2004
INVENTOR(S) : James Albert Stares and Christopher Bittner It is certified that error appears in the above-identified patent and that said Letters Patent is hereby corrected as shown below:

Column 6, Line 45 at Claim 20; replace:
　　"wherein the cage and" with
　　--wherein the cage includes at least one sidewall, and wherein the cage and--

Column 6, Line 50 at Claim 20; delete "and"

Column 6, Line 55 at Claim 20; replace:
　　"closure member." with
　　--closure member; and
　　a pressure recovery between the seating surface and the clearance flow seal, defined by a recess of the closure member with at least one wall substantially parallel to the at least one sidewall of the cage.--

Signed and Sealed this

Twenty-third Day of September, 2008

JON W. DUDAS
*Director of the United States Patent and Trademark Office*